(12) United States Patent
Midkiff

(10) Patent No.: US 6,322,604 B1
(45) Date of Patent: Nov. 27, 2001

(54) FILTRATION MEDIA AND ARTICLES INCORPORATING THE SAME

(75) Inventor: David Grant Midkiff, Alpharetta, GA (US)

(73) Assignee: Kimberly-Clark Worldwide, Inc, Neenah, WI (US)

(*) Notice: Subject to any disclaimer, the term of this patent is extended or adjusted under 35 U.S.C. 154(b) by 0 days.

(21) Appl. No.: 09/588,583

(22) Filed: Jun. 6, 2000

Related U.S. Application Data

(60) Provisional application No. 60/145,038, filed on Jul. 22, 1999.

(51) Int. Cl.[7] .............................. B01D 39/04; B01D 29/56
(52) U.S. Cl. .............................. 55/486; 55/487; 55/511; 55/524; 55/528
(58) Field of Search .............................. 55/527, 528, 486, 55/487, 511, 524, DIG. 31

(56) References Cited

U.S. PATENT DOCUMENTS

| | | |
|---|---|---|
| 3,690,852 | 9/1972 | Smith et al. . |
| 3,795,571 | 3/1974 | Prentice . |
| 4,033,881 | 7/1977 | Pall . |
| 4,041,203 | 8/1977 | Brock et al. . |
| 4,078,124 | 3/1978 | Prentice . |
| 4,438,172 | 3/1984 | Katsutoshi et al. . |
| 4,508,113 | 4/1985 | Malaney . |
| 4,536,440 | 8/1985 | Berg . |
| 4,548,628 | 10/1985 | Miyake et al. . |
| 4,555,811 | 12/1985 | Shimalla . |
| 4,659,609 | 4/1987 | Lamers et al. . |
| 4,692,368 | 9/1987 | Taylor et al. . |
| 4,714,647 * | 12/1987 | Shipp, Jr. et al. .................... 428/212 |
| 4,728,349 * | 3/1988 | Oshitari .................... 55/487 |
| 4,766,029 | 8/1988 | Brock et al. . |
| 4,777,080 | 10/1988 | Harris, Jr. et al. . |
| 4,781,966 | 11/1988 | Taylor . |
| 4,917,942 | 4/1990 | Winters . |
| 4,931,355 | 6/1990 | Radwanski et al. . |
| 4,948,639 | 8/1990 | Brooker et al. . |

(List continued on next page.)

FOREIGN PATENT DOCUMENTS

| | | |
|---|---|---|
| 2069840A | of 1993 | (CA) . |
| 2134668C | 4/1981 | (DE) . |
| 4443158A | 12/1994 | (DE) . |
| 0397403 | 11/1990 | (EP) . |
| 0527489A | 2/1993 | (EP) . |
| 0397403B | 12/1993 | (EP) . |
| 2267681A | 4/1996 | (GB) . |
| 2-104755 | of 1990 | (JP) . |
| 2-154051 | of 1990 | (JP) . |
| 6-248551 | of 1994 | (JP) . |
| 7-138863 | of 1995 | (JP) . |
| 7-207566 | of 1995 | (JP) . |
| 7-275174 | of 1995 | (JP) . |
| 7-95946 | of 1995 | (JP) . |
| 9-29021 | of 1997 | (JP) . |
| 96/03194 | 2/1996 | (WO) . |
| 96/26232 | 8/1996 | (WO) . |
| 98/55295 | 12/1998 | (WO) . |

OTHER PUBLICATIONS

Shell Chemicals—Corterra Polymers, www.shellchemicals.com/corterra, Jul. 1999

Abstract for JP 5015584, published Jan. 26, 1993.

* cited by examiner

Primary Examiner—Robert A. Hopkins
(74) Attorney, Agent, or Firm—Douglas H. Tulley; William W. Letson

(57) ABSTRACT

A durable meltblown filter material is provided comprising a first layer of fine polyester fibers having an average fiber diameter less than 8 micrometers and a second layer of polyester macrofibers having a significant number of fibers in excess of 12 micrometers. The macrofiber layer forms an open structure and the basis weight ratio of fine fiber layer to macrofiber layer can range from 2:1 to 10:1.

20 Claims, 1 Drawing Sheet

U.S. PATENT DOCUMENTS

| | | |
|---|---|---|
| 4,965,000 | 10/1990 | Potts et al. . |
| 5,010,165 | 4/1991 | Pruett et al. . |
| 5,037,409 | 8/1991 | Chen et al. . |
| 5,079,080 | 1/1992 | Schwarz . |
| 5,080,702 | 1/1992 | Bosses . |
| 5,145,727 | 9/1992 | Potts et al. . |
| 5,178,932 | 1/1993 | Perkins et al. . |
| 5,205,938 | 4/1993 | Fiumano et al. . |
| 5,225,014 | 7/1993 | Ogata et al. . |
| 5,229,191 | 7/1993 | Austin . |
| 5,232,770 | 8/1993 | Joseph . |
| 5,244,703 | 9/1993 | Bosses . |
| 5,316,837 | 5/1994 | Cohen . |
| 5,340,479 * | 8/1994 | Seczepanski et al. ............ 210/497.1 |
| 5,350,624 | 9/1994 | Georger et al. . |
| 5,366,786 | 11/1994 | Connor et al. . |
| 5,429,848 | 7/1995 | Ando et al. . |
| 5,554,435 | 9/1996 | Gupta et al. . |
| 5,582,907 | 12/1996 | Pall . |
| 5,586,997 | 12/1996 | Pall et al. . |
| 5,616,408 | 4/1997 | Oleszczuk et al. . |
| 5,639,541 | 6/1997 | Adam . |
| 5,645,057 | 7/1997 | Watt et al. . |
| 5,652,050 | 7/1997 | Pall et al. . |
| 5,721,180 | 2/1998 | Pike et al. . |
| 5,733,635 | 3/1998 | Terakawa et al. . |
| 5,798,167 | 8/1998 | Connor et al. . |
| 5,855,784 * | 1/1999 | Pike et al. ............................ 210/505 |

FILTRATION MEDIA AND ARTICLES INCORPORATING THE SAME

This application claims benefit of Prov. No. 60/145,038 filed Jul. 22, 1999.

FIELD OF THE INVENTION

The present invention relates to filtration media and filters incorporating the same.

BACKGROUND OF THE INVENTION

Polyester nonwoven fabrics and, in particular, meltblown nonwoven fabrics have been used in a variety of filtration and/or barrier-like applications. As an example, polyester nonwoven webs have been used in bag filters and vacuum cleaner filters such as, for example, as described in U.S. Pat. No. 5,080,702 to Bosses, U.S. Pat. No. 5,205,938 to Fiumano et al. and U.S. Pat. No. 5,586,997 to Pall et al. In this regard, paper/meltblown laminates for filtration applications are also known such as, for example, those described in U.S. Pat. No. 5,437,910 to Raabe et al. In addition, polyester nonwoven webs have also been used for filtering biological fluids such as described in U.S. Pat. No. 5,652,050 to Pall et al.

It is generally known in the art that meltblown fiber nonwoven webs often lack the fiber strength and/or tenacity required for certain uses or applications. In this regard, it is known to laminate one or more durable fabrics to the meltblown nonwoven web in order to provide a laminate structure with improved overall characteristics. As an example, U.S. Pat. No. 4,041,203 to Brock et al., U.S. Pat. No. 5,445,110 to Connors and U.S. Pat. No. 5,667,562 to Midkiff describe a durable spunbond/meltblown nonwoven laminate structure which takes advantage of the filtration or barrier properties of the meltblown fabric and the improved strength and durability of the spunbond fabric. The durable spunbond/meltblown/spunbond nonwoven laminate described in Brock et al. is particularly well suited for various uses requiring improved laminate strength and abrasion resistance such as, for example, use as sterilization wrap. While many nonwoven polyester fabrics exhibit excellent strength and durabilty, polyester meltblown nonwovens do not exhibit high strength and durability since the meltblowing process does not adequately draw the fibers so as to significantly promote crystallization of the polymer. Thus, it is likewise known in the art to improve the strength and durability of meltblown polyester materials by laminating a separate durable fabric thereto such as, for example, a spunbond fiber web or other suitable supporting fabric. As a particular example, meltblown polyester nonwoven webs can be laminated with durable fabrics such as those comprising high strength polyester filaments such as, for example, those described in JP Kokai Patent Application No. Hei 7-207566. The polyester filaments have improved strength since they have undergone separate drawing steps which orient the polymer thereby improving the strength and tenacity of both the fibers and the fabric made therefrom. The meltblown fiber web and the drawn fibers may be thermally point bonded to one another. Additionally, it is noted that utilizing one or more support layers can significantly increase the overall cost of the laminate as the need for the supporting material requires additional processing steps to bring the materials together and also a bonding step. Further, formation of both filtration grade materials and high-strength materials often requires significantly increased capital costs as requiring separate and distinct production equipment.

While there exist multilayer laminates that have excellent strength and durability, often the means for permanently bonding the individual layers together can negatively impact the filter efficiency and life. As an example, spunbond and meltblown fiber nonwoven webs are often thermally point-bonded. The bonded areas are highly fused areas which allow little, if any, penetration of the fluid to be filtered. Thus, the bond areas reduce the effective area of the filter and increase pressure drop across the filter media. In addition, use of adhesives and other bonding methods can likewise negatively impact filter efficiency and/or life. Thus, improved abrasion resistance and/or laminate integrity achieved in this manner often comes at the expense of the overall permeability and/or filtration efficiency of the fabric. Consequently, the ability to achieve such improved properties without sacrificing other desired attributes of the filter media material has proven difficult.

As a result, there exists a need for a filter media having improved strength and/or durability. Further, there exists a need for such a filtration media that can be manufactured more efficiently and cost effectively than heretofore. Still further, there exists a need for such filter media that can withstand rigors of converting and use.

SUMMARY OF THE INVENTION

The aforesaid needs are fulfilled and the problems experienced by those skilled in the art overcome by the filter media of the present invention comprising a first layer of microfibers having an average fiber diameter less than about 8 micrometers and a second layer of macrofibers comprising fibers having a diameter in excess of about 15 micrometers. The layer of macrofibers is autogenously bonded to the layer of microfibers whereby the multi-layered filter media has, by virtue of the macrofiber layer, increased strength and/or abrasion resistance. Desirably, the fibers comprise a thermoplastic polycondensate such as, for example, a polyester. In a further aspect, the first layer of microfibers can comprise meltblown fibers having an average fiber diameter less than about 8 micrometers and the second layer can comprise meltblown fibers having a significant number of fibers having a diameter between about 12 micrometers and 80 micrometers. In one aspect, the microfiber layer can have a basis weight of between about 12 g/m$^2$ and about 350 g/m$^2$ and the macrofiber layer can have a basis weight less than about 100 g/m$^2$. In still a further aspect of the invention, the multi-layer material can be laminated to a paper filter material.

DEFINITIONS

As used herein, the term "comprising" is inclusive or open-ended and does not exclude additional unrecited elements, compositional components, or method steps.

As used herein the term "nonwoven" fabric or web means a web having a structure of individual fibers or threads which are interlaid, but not in an identifiable manner as in a knitted or woven fabric. Nonwoven fabrics or webs have been formed by many processes such as for example, meltblowing processes, spunbonding processes, hydroentangling, air-laying, carded web processes, and so forth.

As used herein, the term "machine direction" or "MD" means the length of a fabric in the direction in which it is produced. The term "cross machine direction" or "CD" means the width of fabric, i.e. a direction generally perpendicular to the MD.

As used herein, the term "fluid" is meant to encompass all fluids including both gases and liquids.

As used herein, the term "liquid" refers to liquids generally regardless of composition and includes solutions, emulsions, suspensions and so forth.

As used herein the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" includes all possible spatial configurations of the molecule. These configurations include, but are not limited to isotactic, syndiotactic and random symmetries. In addition, it is to be further understood that reference to a polymer of any particular monomeric unit encompasses the presence of one or more additional components, in addition to the named monomer.

As used herein, the term "autogenous bonding" refers to inter-fiber bonding between discrete parts and/or surfaces independently of mechanical fasteners or external additives such as adhesives, solders, and the like.

DESCRIPTION OF THE PREFERRED EMBODIMENTS

Figure 1:
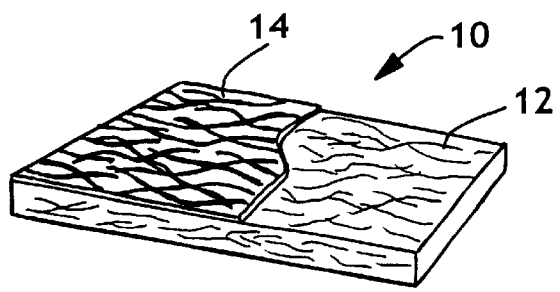
FIG. 1 is a partially elevated side view of a two-layer material of the present invention shown partially broken away.

In reference to FIG. 1, filter 10 comprises at least two layers including a first layer 12 of fine fibers or microfibers and a second layer 14 of larger fibers or macrofibers. The first layer is desirably a relatively thicker layer having a small average pore size and good filtration and/or barrier properties. The filter material is typically made in the form of a sheet and can readily be stored in roll form. Thus, the filter material can be subsequently converted as desired to provide a filter specifically tailored to meet the needs of the end user. However, the filter material can also be cut to the desired dimensions and/or shape as needed via in-line methods. The filter media of the present invention provides a meltblown fiber nonwoven web which exhibits good abrasion resistance without significantly degrading the strength and/or filtration properties of the same.

The first layer desirably comprises a nonwoven web of fine fibers or microfibers having an average fiber diameter of less than about 8 micrometers and more desirably having an average fiber diameter between about 0.5 micrometer and about 6 micrometers and still more desirably between about 3 micrometers and about 5 micrometers. The first layer desirably has a basis weight of at least 12 grams/square meter ($g/m^2$) and more desirably have a basis weight between about 17 $g/m^2$ and about 175 $g/m^2$, and still more desirably between about 34 $g/m^2$ and about 100 $g/m^2$. Fine fibers can be made by various methods known in the art. Desirably the first layer comprises a nonwoven web of fine meltblown fibers. Meltblown fibers are generally formed by extruding a molten thermoplastic material through a plurality of die capillaries as molten threads or filaments into converging high velocity air streams that attenuate the filaments of molten thermoplastic material to reduce their diameter. Thereafter, the meltblown fibers can be carried by the high velocity gas stream and are deposited on a collecting surface to form a web of randomly laid meltblown fibers. Meltblown processes are disclosed, for example, in Naval Research Laboratory Report No. 4364, "Manufacture of Super-fine Organic Fibers" by V. A. Wendt, E. L. Boon, and C. D. Fluharty; Naval Research Laboratory Report No. 5265, "An Improved Device for the Formation of Super-fine Thermoplastic Fibers" by K. D. Lawrence, R. T. Lukas, and J. A. Young; U.S. Pat. No. 3,849,241 to Butin et al.; U.S. Pat. No. 4,100,324 to Anderson et al.; U.S. Pat. No. 3,959,421 to Weber et al.; U.S. Pat. No. 5,652,048 to Haynes et al.; and U.S. Pat. No. 4,526,733 to Lau et al. The meltblown fiber layer can be formed by a single meltblown die or by consecutive banks of meltblown fiber dies by consecutively depositing the fibers over one another on a moving forming surface. Thus, although the term "layer" is used, one layer may in fact comprise several sublayers assembled to obtain the desired thickness and/or basis weight.

Suitable thermoplastic polymers for forming the first layer of fine fibers as well as the second layer of larger fibers include, by way of example only, polycondensates (e.g. polyamides, polyesters, polycarbonates, and polyarylates), polydienes, polyurethanes, polyethers, polyacrylates and so forth. Desirably the filter media comprises a thermoplastic polyester such as, for example, polyethylene terephthalate (PET), polybutylene terephthalate (PBT), polytrimethylene terephthalate (PTT) and so forth. PBT and PET polymers are commercially available from numerous vendors and an exemplary PBT polymer is available from Ticona Corporation under the trade designation CELANEX 2008 thermoplastic polyester. PTT polymers are available from Shell Chemical Company under the trade name CORTERRA POLYMERS. The selection of the particular polymer or polymers will vary with the intended application of the filter as well as other factors known to those skilled in the art. In addition, while the respective fine fiber layer and macrofiber layer may comprise different polymers, desirably the macrofiber layer comprises a polymer substantially similar and/or identical to the polymer comprising the finer fiber layer.

The macrofiber layer comprises larger fibers of sufficient number and size so to create an open structure having improved strength relative to the first fine fiber layer. Desirably the macrofiber layer has a significant number of fibers in excess of about 15 micrometers and still more desirably has a substantial number of fibers in excess of about 25 micrometers. In this regard, it is noted that the coarse fibers can comprise a plurality of smaller fibers having diameters between about 10 and about 35 micrometers and still more desirably an average fiber diameter of between about 12 micrometers and about 25 micrometers wherein the individual fibers "rope" or otherwise become length-wise bonded so as to collectively form large, unitary fibers or filaments. In calculating average fiber size, the length-wise bonded fibers are treated as a single fiber. The macrofiber layer desirably has a basis weight less than about 100 $g/m^2$ and more desirably has a basis weight between about 10 $g/m^2$ and about 70 $g/m^2$, and still more desirably between about 15 $g/m^2$ and about 35 $g/m^2$. In a further aspect, the basis weight ratio of the first layer of fine fibers to the second layer of macrofibers desirably ranges from about 2:1 to about 10:1 and in a preferred embodiment the ratio of the first layer of fine fibers to the second layer of coarse fibers is about 3.3:1.

Figure 2:
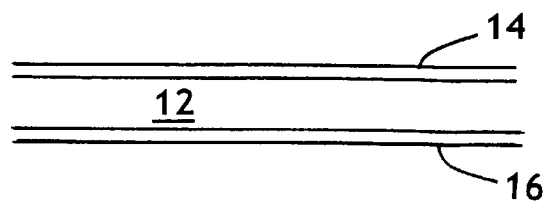
FIG. 2 is a cross-sectional side view of a three-layer material of the present invention.

The second layer of macrofibers can be made by meltblown processes and, desirably, the macrofibers can be deposited directly onto the fine fiber web in a semi-molten state such that the macrofibers bond directly and autogenously to the fine fiber web. The deposition of the macrofibers is such that they have sufficient latent heat to more effectively bond to each other as well as to the previously deposited fine fibers thereby creating a filter media having overall improved strength and/or abrasion resistance. Conventional meltblowing equipment can be used to produce such larger, coarse fibers by properly balancing the polymer throughput, diameter of the die tip orifice, formation height (i.e. the distance from the die tip to the forming surface), melt temperature and/or draw air temperature. As a specific example, the last bank in a series of meltblown fiber banks can be adjusted whereby the last meltblown bank makes and deposits a layer of macrofibers over the newly formed fine fiber nonwoven web. With regard to making larger thermoplastic polyester fibers, by reducing the primary air temperature and/or lowering the formation height, production of larger, coarse fibers is achieved. The thickness or basis weight of the macrofiber layer can be increased as desired by increasing the number of consecutive meltblown banks altered to provide larger, coarse fibers. It is noted that alteration of other parameters alone or in combination with the aforesaid parameters may also be used to achieve macrofiber layers and/or webs. Methods of making such larger, coarse fibers are described in more detail in U.S. Pat. No. 4,659,609 to Lamers et al. and U.S. Pat. No. 5,639,541 to Adam, the entire contents of the aforesaid references are incorporated herein by reference. Desirably, the macrofiber layer is deposited co-extensively with the fine fiber layer and adheres directly thereto. In this regard, it will be appreciated that the macrofibers are not significantly drawn and/or oriented nevertheless, since the macrofibers are deposited upon the fine fibers in a semi-molten state they form good inter-fiber bonds with the fine fiber fibers as well as other coarse fibers and thereby provide a composite structure which has improved strength and resistance to pilling during handling, converting and/or use. Moreover, despite the formation of a layer having increased irregularity, polymeric globules and/or shot, the macrofiber layer forms an open structure that does not significantly decrease the filtration efficiency and/or create Tinting or other particulates detrimental to use of the same in filtration applications. In a further aspect, it is possible to deposit more than one macrofiber layer on the fine fiber layer. As an example, and in reference to FIG. 2, macrofiber layers 14, 16 can be formed over both sides of the first fine fiber layer 12 in order to form the filter material comprising first layer of fine fibers 12 positioned between a second layer 14 of macrofibers and third layer 16 of macrofibers. In this regard, a two-layer laminate comprising a first layer of fine fibers and a second layer of macrofibers can be unwound from a supply roll and directed under a meltblowing die with the fine fiber layer facing up. Thus, a layer of microfibers is deposited directly upon and adheres to the exposed side of the fine fiber layer forming an autogenously bonded three-layer laminate.

The multilayer nonwoven of the present invention is autogenously bonded and does not necessarily require additional binding. However, after the deposition of the layers, the layers can, optionally, be further bonded together to improve the overall integrity of the multilayer structure and/or to impart stiffness to the same. Whenever further bonding is desired it is preferred to employ a bond pattern effecting a minimal surface area of the material since filtration efficiency typically decreases as the bonding area increases. Thus, desirably the bond pattern employed does not bond more than about 10% of the surface area of the sheet and still more desirably the bond area comprises between 0.5% and about 5% of the surface area of the fabric. The multilayer laminate can be bonded by continuous or substantially continuous seams and/or discontinuous bonded regions. Preferably the multi-layered filter media materials are point bonded. As used herein "point bonded" or "point bonding" refers to bonding one or more layers of fabric at numerous small, discrete bond points. For example, thermal point bonding generally involves passing one or more layers to be bonded between heated rolls such as, for example an engraved patterned roll and an anvil roll. The engraved roll is patterned in some way so that the entire fabric is not bonded over its entire surface, and the anvil roll is usually flat. Numerous bond patterns have been developed in order to achieve various functional and/or aesthetic attributes, and the particular nature of the pattern is not believed critical to the present invention. Exemplary bond patterns are described in U.S. Pat. No. 3,855,046 to Hansen et al. U.S. Design Pat. No. 356,688 to Uitenbroek et al. and U.S. Pat. No. 5,620,779 to Levy et al. These and other bond patterns can be modified as necessary to achieve the desired bonding area and frequency.

Figure 4:
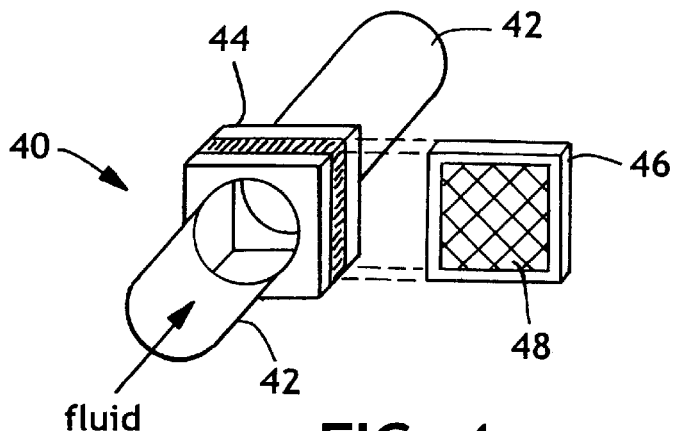
FIG. 4 is a schematic representation of a filter assembly employing filter material of the present invention.

Meltblown filter laminates of the present invention are well suited for fluid filtration applications and, including, liquid filtration applications. The filter material will most commonly be employed as part of a filter assembly which can comprise the filter media, a frame and housing. As used herein the term frame is used in its broadest sense and includes, without limitation, edge frames, mesh supports, cartridges, and other forms of filter elements. The filter media will commonly be secured and/or supported by a frame. Often the frame is slideably engaged with the housing. The frame can be designed so as to be capable of being releasably engaged in the housing element such that the frame, and corresponding filter media, can be readily replaced as needed. As examples, the frame and/or housing can be adapted so that the frame can be manually rotated, screwed, bolted, snapped, slid or otherwise secured into position. As an example, and in reference to FIG. 4, filter assembly 40 can contain a channel 42 for directing fluid and filtrate in the direction of the arrows associated therewith and further contain a filter housing 44 such that frame 46 and filter material 48 can be slid in position so as to traverse the channel 42 and fluid path.

The nonwoven filtration material can be used alone or as part of a laminate structure in combination with additional materials. As a particular example, the nonwoven fabric can be laminated with an additional filter material such as, for example, paper, membranes, battings, nonwovens, woven fabrics, cellular foams, and other filter and/or reinforcement filter material. Paper filter materials are available in a wide variety of grades and forms. As an example, the filter paper can comprise a cellulose-based paper containing a phenol-formaldehyde resin. The filtration efficiency of the filter paper can be modified as desired by selecting the amount and type of resin binders, cellulose fiber size or furnishings, processing parameters and other factors known to those skilled in the art. The additional filtration material can be fixedly attached to the nonwoven filter media via one or more methods known to those skilled in the art. Desirably the paper filter is laminated to the nonwoven filter material via an adhesive. In this regard, the nonwoven material can be sprayed with an adhesive and then the paper filter and nonwoven filter superposed and pressed together such that they become permanently attached to one another. By applying the adhesive to the nonwoven the filtration efficiency of the paper filter material is not substantially degraded since only adhesive upon the fiber surface will contact the paper filter material thereby minimizing any loss in filtration efficiency. Alternately, the adhesive can be sprayed onto the filter paper and then the treated side of the filter paper and the nonwoven can be permanently attached to one another. In a particular aspect of the invention, depending on the grade of filter paper, the nonwoven/paper laminate can have a filtration efficiency of at least about 98% for $10\mu$ particles and in a further aspect can have a filtration efficiency of at least about 98% for $2\mu$ particles.

Figure 3:
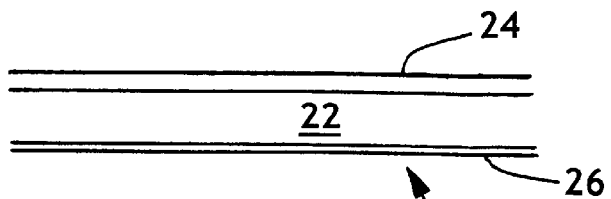
FIG. 3 is a cross-sectional side view of a paper/nonwoven laminate of the present invention.

In reference to FIG. 3, desirably filter media 20 comprises a fine fiber layer 22 positioned between a macrofiber layer 24 and a filter paper sheet 26. As a specific example, a paper filter sheet can be adhesively laminated to a 65 g/m² layer of fine fibers, comprising PBT meltblown fibers, such that the paper filter adheres directly to one side of the fine fiber layer and the macrofiber layer adheres to the second or opposite side of the fine fiber layer. The macrofiber layer likewise desirably comprises a PBT polymer and can have a basis weight of approximately 20 g/m². The filter material of this configuration is particularly well suited for use as a coalescing filter such as used in diesel engines and marine applications. The laminate prevents passage of both water and particles while allowing fuel to pass therethrough. The nonwoven fabric of polyester substantially prevents passage of water through the media and as well as large particles. The paper filter media further filters finer particles from the fuel. Coalescing filter media are commonly employed within a frame and housing located either upstream or downstream of the liquid hydrocarbon pump.

In addition, the filter material of the present invention can, optionally, include various internal additives and/or topically applied treatments in order to impart additional or improved characteristics to the nonwoven fabric. Such additives and/or treatments are known in the art and include, for example, alcohol repellence treatments, anti-static treatments, wetting chemistries (i.e. compositions which improve or make a surface hydrophilic), anti-oxidants, stabilizers, fire retardants, disinfectants, anti-bacterial agents, anti-fungal, germicides, virucides, detergents, cleaners and so forth.

Tests

Mullen Burst: This method measures the resistance of textile fabrics to bursting when subjected to a distending force, i.e. hydraulic pressure, applied through a rubber diaphragm at right angles to the plane of the fabric. The Mullen Burst or bursting strength was carried out according to the specifications of TAPPI Official Standard T 403 os-76 except that the specimen size used was 5"×5" and ten specimens are tested from each sample.

Frazier Air Permeability: This test determines the airflow rate through a specimen for a set area size and pressure. The higher the airflow rate per a given area and pressure, the more open the material is, thus allowing more fluid to pass therethrough. The air permeability data reported herein was obtained using a TEXTEST FX 3300 air permeability tester.

EXAMPLES

Example 1

An 88 g/m² meltblown fiber web was made having two distinct layers; the meltblown fiber web comprised a first 68 g/m² fine fiber meltblown layer and a second 20 g/m² coarse fiber meltblown layer. Both the fine and coarse fibers comprised PBT having an intrinsic viscosity of 0.65 dl/g, available from Ticona Corporation under the designation CELANEX 2008 thermoplastic polyester. The fine fiber layer was made using a primary air temperature of 501° F., a primary air pressure of 9.3 psi and a line speed of 46 feet/minute whereas the coarse fiber layer was made using a primary air temperature of 489° F., a primary air pressure of 2.1 psi and a line speed of 125 feet/minute. The fine fiber layer comprised fibers having an average fiber size of approximately 3–5 micrometers and the coarse fiber layer had an average fiber size of about 20 micrometers and included a significant number of length-wise bonded fibers that collectively formed large filaments. The coarse fiber layer comprised numerous large fibers. The coarse fiber meltblown was deposited co-extensively with the fine fiber layer and directly adhered thereto. The resulting meltblown web had improved abrasion resistance while also having a Mullen burst of 23 pounds/square inch (psi) (wire side facing diaphragm) and an air permeability of 46 ft.³/minute/ft.² at ½ inch water.

While various patents and other reference materials have been incorporated herein by reference, to the extent there is any inconsistency between incorporated material and that of the written specification, the written specification shall control. In addition, while the invention has been described in detail with respect to specific embodiments thereof, and particularly by the examples described herein, it will be apparent to those skilled in the art that various alterations, modifications and other changes may be made without departing from the spirit and scope of the present invention. It is therefore intended that all such modifications, alterations and other changes be encompassed by the claims.

What is claimed is:

1. A filter comprising:
    a frame having a nonwoven filter material fixedly attached thereto;
    said nonwoven filter material comprising (i) a first layer of thermoplastic polycondensate polymer microfibers having an average fiber size of less than about 8 micrometers and (ii) a second layer comprising thermoplastic polycondensate polymer fibers having fibers in excess of 12 micrometers and wherein said second layer is autogenously bonded to said first layer and wherein said second layer has a basis weight less than 34 g/m².

2. The filter of claim 1 wherein said second layer comprises meltblown fibers.

3. The filter of claim 1 wherein said second layer includes lengthwise-bonded fibers.

4. The filter of claim 1 wherein said first layer of microfibers comprises meltblown fibers having a basis weight between 17 g/m² and 300 g/m² and further wherein said first layer of microfibers have an average fiber diameter between about 0.5 micrometers and about 6 micrometers.

5. The filter of claim 1 wherein said first and second layers comprise a thermoplastic polyester.

6. The filter of claim 5 wherein the basis weight ratio of the first layer to the second layer is between 2:1 and 10:1.

7. The filter of claim 5 wherein said first and second layers comprise polybutylene terephthalate.

8. The filter of claim 1 further comprising a filter paper sheet laminated to the nonwoven filter material.

9. The filter of claim 8 wherein a filter paper sheet is laminated to the first layer of the nonwoven filter material.

10. The filter of claim 5 further comprising a filter paper sheet laminated to the nonwoven filter material.

11. The filter of claim 10 herein filter paper is laminated to the first layer of the nonwoven filter material.

12. The filter of claim 1 wherein said first and second layers of the nonwoven filter material both comprise meltblown thermoplastic polyester fibers and wherein said first layer has a basis weight between 34 g/m$^2$ and about 175 g/m$^2$.

13. The filter of claim 12 wherein said polyester comprise polybutylene terephthalate.

14. The filter of claim 13 further comprising a filter paper sheet laminated to the nonwoven filter material.

15. The filter of claim 14 wherein said filter paper sheet is laminated to the first layer of nonwoven filter material.

16. The filter of claim 2 wherein said nonwoven filter material comprises a third layer comprising thermoplastic polymer meltblown fibers having fibers in excess of about 12 micrometers and wherein said third layer is autogenously bonded to said first layer.

17. The filter material of claim 16 wherein said third layer has a basis weight less than 34 g/m$^2$.

18. The filter of claim 17 wherein said first layer has a basis weight between about 34 g/m$^2$ and 150 g/m$^2$ and further wherein said first, second and third layers comprise polyester fibers.

19. The filter of claim 18 wherein a filter paper sheet is laminated to the nonwoven filter material.

20. A filter comprising:

a frame having a nonwoven filter material fixedly attached thereto;

said nonwoven filter material comprising (i) a first layer of thermoplastic polycondensate polymer microfibers having an average fiber size of less than about 8 micrometers and (ii) a second layer comprising thermoplastic polycondensate polymer fibers having fibers in excess of 12 micrometers and wherein said second layer is autogenously bonded to said first layer and wherein said second layer has a basis weight less than 34 g/m$^2$ and wherein the basis weight ratio of the first layer to the second layer is between 2:1 and 10:1.

* * * * *

UNITED STATES PATENT AND TRADEMARK OFFICE
Certificate

Patent No. 6,322,604 B1

Patented: November 27, 2001

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: YNaoko Tsuji, Haga-gun, Japan; Shigeru Moriwaki, Haga-gun, Japan; and Genji Imokawa, Haga-gun, Japan.

Signed and Sealed this Twenty-Ninth Day of October 2002.

MARIANNE SEIDEL
*Supervisory Patent Examiner*
Art Unit 1614

UNITED STATES PATENT AND TRADEMARK OFFICE
Certificate

Patent No. 6,322,604 B1

Patented: November 27, 2001

On petition requesting issuance of a certificate for correction of inventorship pursuant to 35 U.S.C. 256, it has been found that the above identified patent, through error and without any deceptive intent, improperly sets forth the inventorship. The previous certificate for correction of inventorship issued October 29, 0202 listing the incorrect set of inventors in patent is hereby vacated.

Accordingly, it is hereby certified that the correct inventorship of this patent is: David Grant Midkiff, Alpharetta, GA (US); and John Joseph Lassig, Cumming, GA (US).

Signed and Sealed this Twenty-first Day of September 2010.

Duane Smith
*Supervisory Patent Examiner*
Art Unit 1797
Technology Center 1700